United States Patent
Abedini et al.

(10) Patent No.: US 12,185,249 B2
(45) Date of Patent: Dec. 31, 2024

(54) MODE MANAGEMENT FOR NETWORK ENTITY ENERGY SAVINGS

(71) Applicant: QUALCOMM Incorporated, San Diego, CA (US)

(72) Inventors: Navid Abedini, Basking Ridge, NJ (US); Jianghong Luo, Skillman, NJ (US); Naeem Akl, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/661,233

(22) Filed: Apr. 28, 2022

(65) Prior Publication Data

US 2023/0354197 A1 Nov. 2, 2023

(51) Int. Cl.
*H04W 52/02* (2009.01)
*H04W 48/10* (2009.01)

(52) U.S. Cl.
CPC ....... *H04W 52/0235* (2013.01); *H04W 48/10* (2013.01)

(58) Field of Classification Search
None
See application file for complete search history.

(56) References Cited

U.S. PATENT DOCUMENTS

| 2012/0088531 | A1* | 4/2012 | Bonneville | H04W 52/0206 455/500 |
| 2020/0008247 | A1* | 1/2020 | Kwak | H04B 7/0695 |
| 2020/0059970 | A1* | 2/2020 | Islam | H04W 56/005 |
| 2020/0260304 | A1* | 8/2020 | Zhou | H04W 72/23 |
| 2023/0328644 | A1* | 10/2023 | Wu | H04W 52/0206 370/311 |
| 2024/0137849 | A1* | 4/2024 | Li | H04W 48/16 |

* cited by examiner

*Primary Examiner* — Hong S Cho
(74) *Attorney, Agent, or Firm* — Patterson + Sheridan, L.L.P./Qualcomm

(57) ABSTRACT

Certain aspects of the present disclosure provide techniques for wireless communications in a network. A method includes receiving, from a first user equipment, a first uplink trigger message in a receive direction while in a first energy mode, wherein while in the first energy mode, the network entity is configured to: deactivate any synchronization signal blocks (SSBs) in the receive direction; monitor for uplink trigger messages during one or more configured uplink trigger occasions; and transitioning from the first energy mode to a second energy mode based at least in part on the first uplink trigger message, wherein while in the second energy mode, the network entity is configured to: activate one or more SSBs in the receive direction; and monitor for uplink trigger messages during the one or more configured uplink trigger occasions.

29 Claims, 12 Drawing Sheets

MODE MANAGEMENT FOR NETWORK ENTITY ENERGY SAVINGS

BACKGROUND

Field of the Disclosure

Aspects of the present disclosure relate to wireless communications, and more particularly, to techniques for managing energy saving mode transitions at a network entity.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a network entity. The method includes receiving, from a first user equipment, a first uplink trigger message in a receive direction while in a first energy mode, wherein while in the first energy mode, the network entity is configured to: deactivate any synchronization signal blocks (SSBs) in the receive direction; monitor for uplink trigger messages during one or more configured uplink trigger occasions; and transitioning from the first energy mode to a second energy mode based at least in part on the first uplink trigger message, wherein while in the second energy mode, the network entity is configured to: activate one or more SSBs in the receive direction; and monitor for uplink trigger messages during the one or more configured uplink trigger occasions.

Another aspect provides a method of wireless communications by a user equipment. The method includes monitoring for one or more downlink signals from a network entity while camping on the network entity; transmitting, to the network entity, a first uplink trigger message in a send direction during a configured uplink trigger occasion; and receiving, from the network entity, one or more SSBs in the send direction after transmitting the first uplink trigger message.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
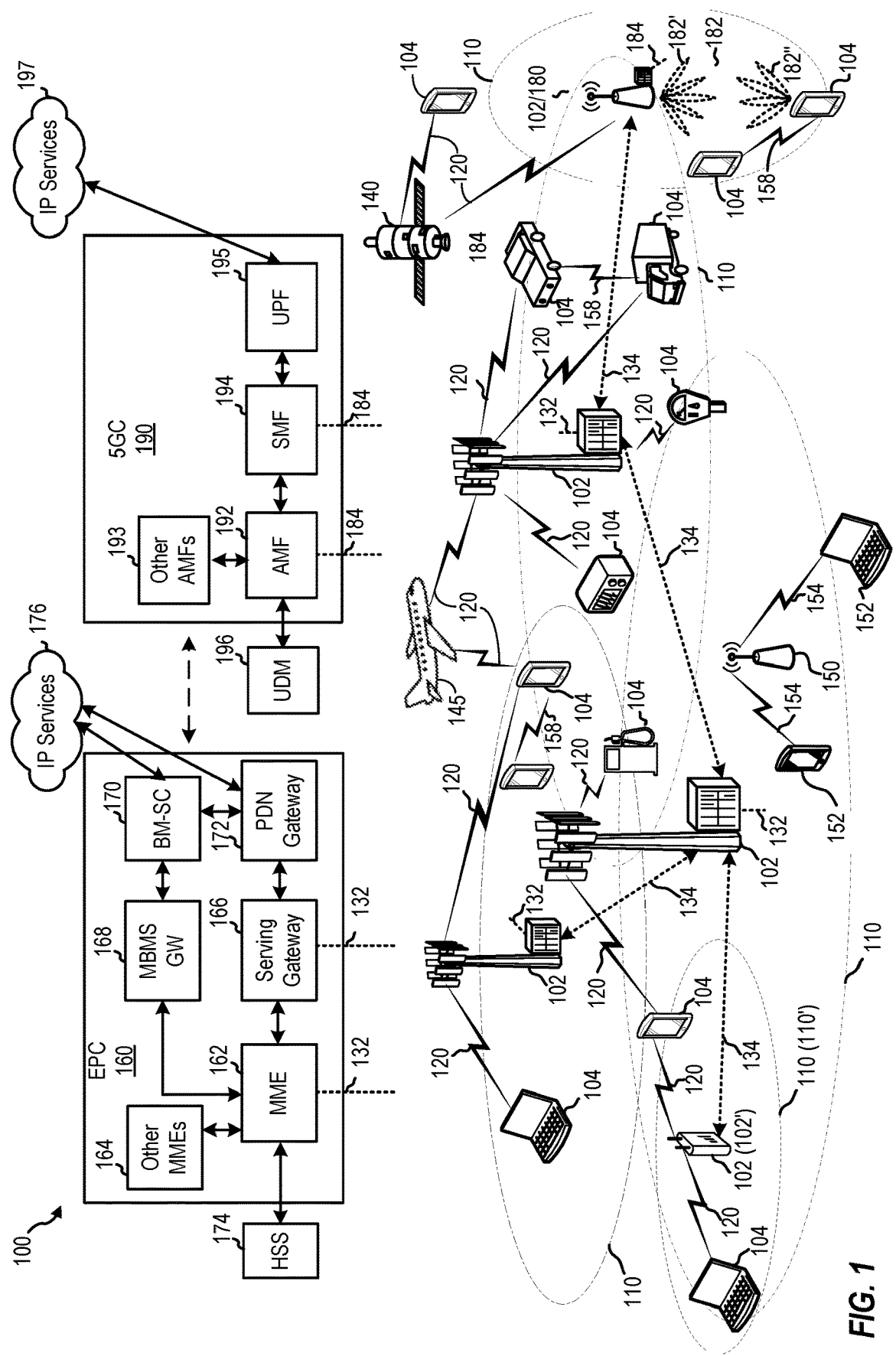
FIG. 1 depicts an example wireless communications network.

Aspects of the present disclosure provide apparatuses, methods, processing systems, and computer-readable mediums for managing energy saving mode transitions at a network entity.

Network entities in a wireless communications system, such as base stations, routinely broadcast a myriad of information-bearing signals that allow devices, such as user equipments to find, connect to, and interact with the wireless communications system. One example is the periodic broadcast of "system information", which generally refers to common (e.g., non-device-specific) information that a device, such as a user equipment, needs in order to properly operate within the wireless communication network. System information is often transmitted within so-called System Information Blocks (SIBs), which may include different types of system information. One such system information block is referred to as "SIB 1" (which may also be referred to as the remaining minimum system information (RMSI)) and generally includes the system information that a user equipment needs to access the wireless communications system, such as information the user equipment needs in order to carry out an initial random access procedure. Conventionally, SIBs, including SIB 1, are broadcast periodically over an entire cell area.

Another example is the periodic broadcast by network entities of a primary synchronization signal (PSS), a secondary synchronization signal (SSS), and physical broadcast channel (PBCH), each of which is used by user equipments to find, synchronize to, and identify a network. The PSS, SSS, and PBCH may be jointly referred to as a synchronization signal block (SSB).

Power consumed by a wireless communications system is a significant operational and environmental issue. There is a natural tension between more frequent broadcasts of signals, such as SIBs and SSBs, which enable fast access to the network at the cost of increased power consumption, and less frequent broadcast of such signals, which saves power, but reduces network access speed. Accordingly, it is desirable to limit such broadcasts to improve network energy efficiency while not harming network access.

When trying to determine when and how to curtail broadcasts of periodic signals, such as SIBs and SSBs, in an effort to reduce power consumption, a complication arises in that user equipments may "camp on" a cell of a wireless communications system and silently rely on the periodic broadcast of signals, such as SIBs and SSBs, without the cell being aware of the camping user equipment. Camping on a cell generally refers to a user equipment monitoring broadcasts from a cell in an effort to maintain readiness to actively connect to and utilize the wireless communications system. Consequently, it is not feasible for a network entity to discontinue broadcasts of signals used by camping user equipments (e.g., in RRC idle mode) merely because no user equipment is currently actively utilizing the network entity (e.g., in RRC connected mode) and interacting with the wireless communication system. Thus, an extant technical problem is how a network entity can determine when the network entity can enter an energy saving mode (or state) in which certain broadcasts are curtailed (such as SIBs and/or SSBs) without negatively affecting camping user equipments.

Aspects described herein overcome this technical problem by providing a mode transitioning framework that beneficially enables network entities to transition between various power modes, including into power savings modes, without negatively affecting camping user equipments. In particular, aspects described herein enable a network entity to transition to energy savings modes in which periodic signals, such as SSBs, are not broadcast while monitoring for signals from user equipments that trigger a resumption of broadcasts, in some cases in a time-limited fashion. Beneficially, such modes can be cell, beam, and/or direction-specific, such that a network entity can maximize its ability to enter energy savings mode when there are no user equipments being served by a particular cell or beam, or from a particular direction.

Likewise, aspects described herein enable camping user equipments to signal a network entity to continue broadcasting periodic signals, such as SSBs, in order to maintain a state of readiness to connect to and interact with a serving network entity.

Aspects described herein thus provide a technical solution in which a wireless communications system is able to reduce power use and improve efficiency without reducing the accessibility of the network and without negatively impacting camping user equipments. In addition to reducing wireless communications system energy use, network overhead is reduced and resource utilization is improved because time and frequency resources dedicated to periodic signals serving no user equipments can be beneficially reallocated to useful ends.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
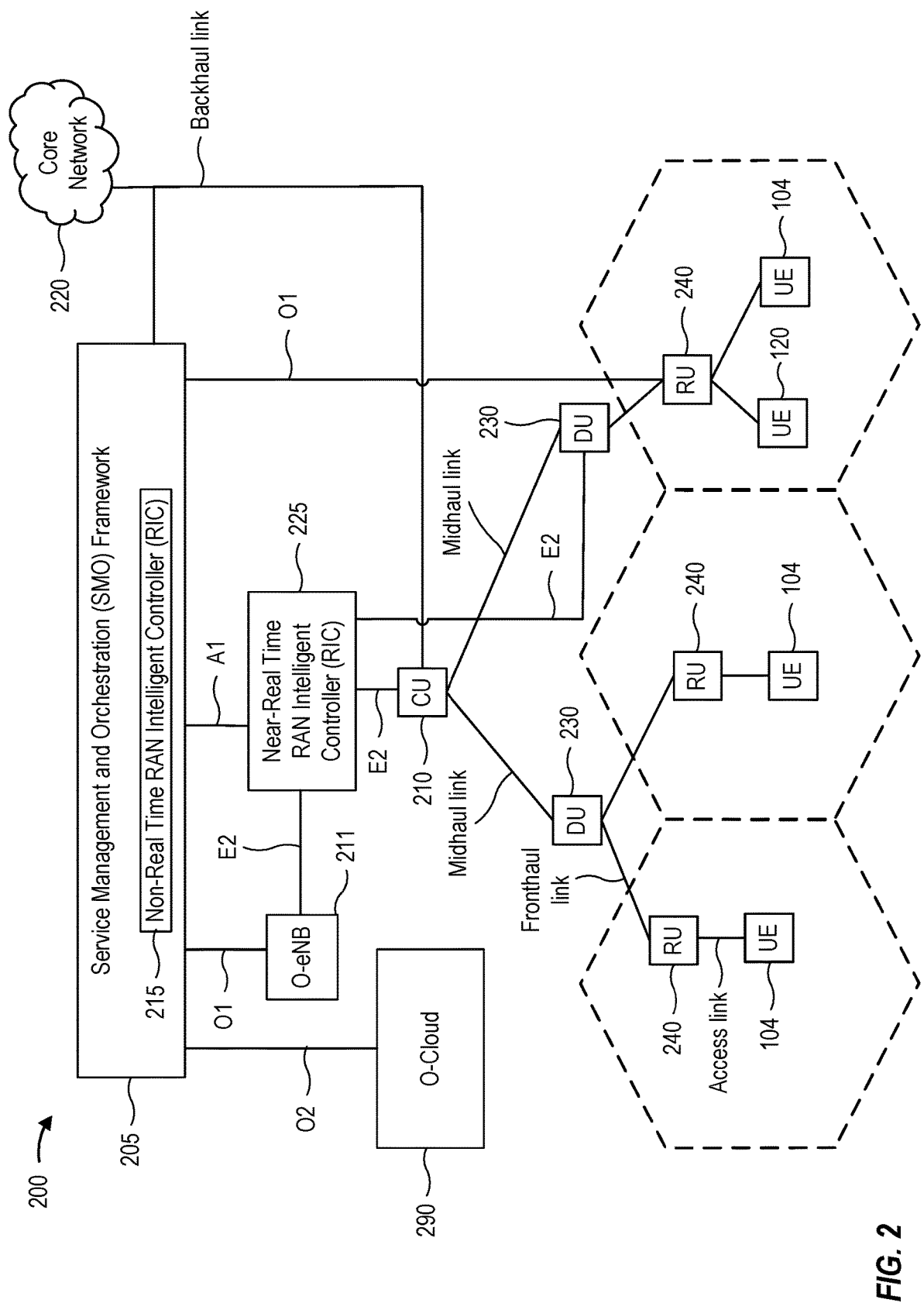
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT MC 225, the Non-RT RIC 215 may receive parameters or external enrichment information from external servers. Such information may be utilized by the Near-RT MC 225 and may be received at the SMO Framework 205 or the Non-RT MC 215 from non-network data sources or from network functions. In some examples, the Non-RT MC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
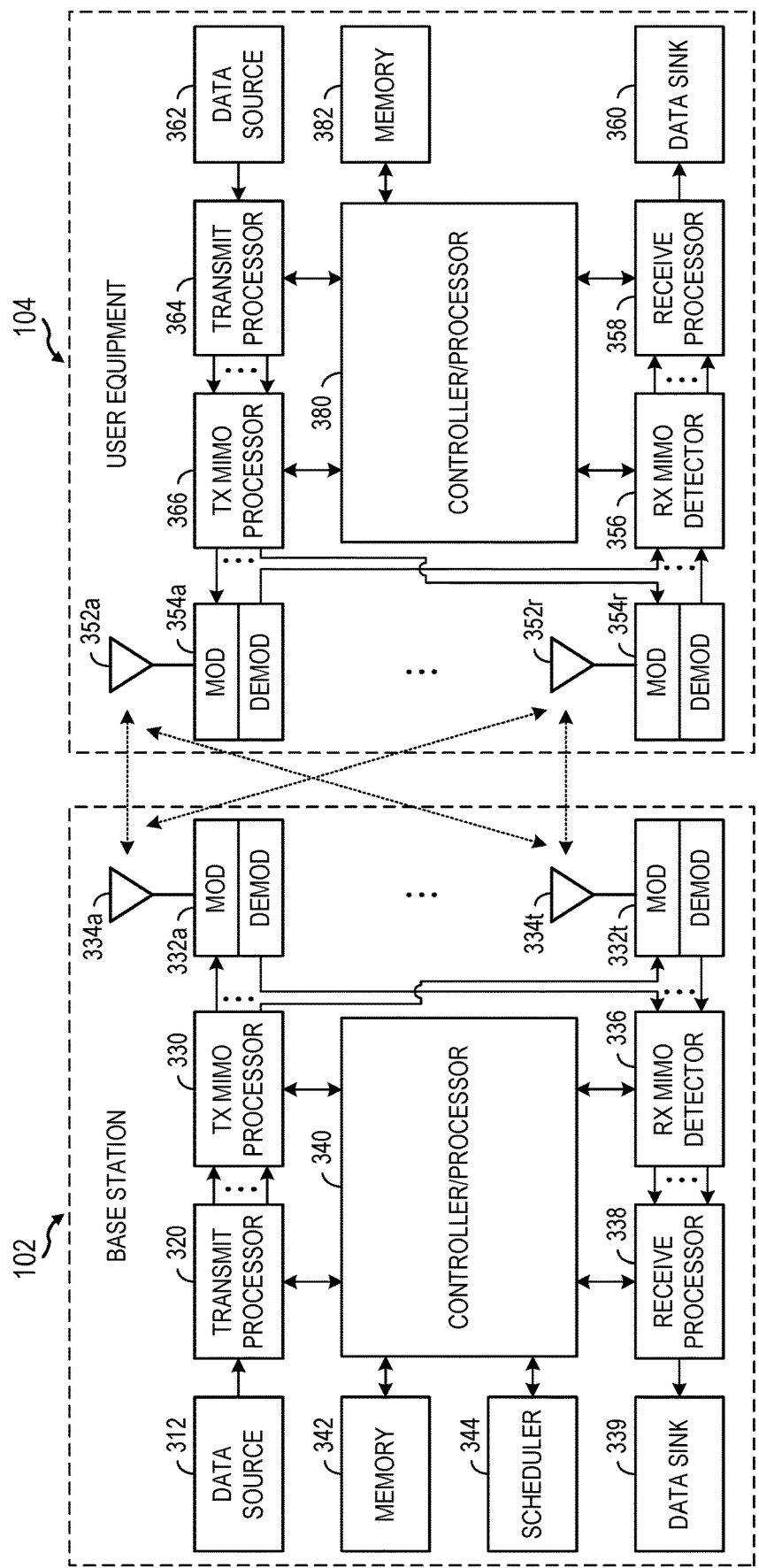
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
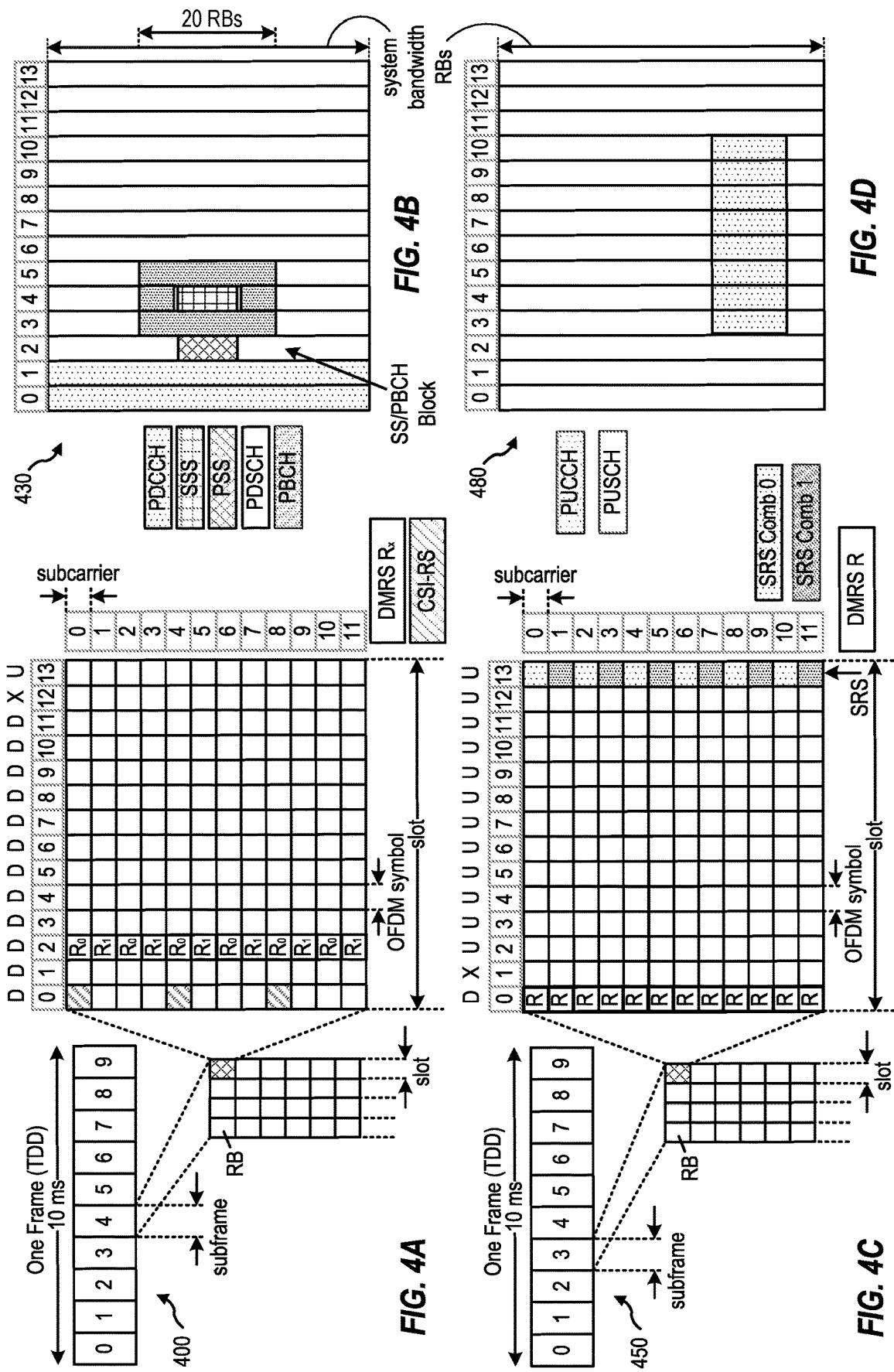
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot.

Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Mode Management for Network Entity Energy Savings

As described above, it is beneficial for a network entity to be able to reduce power use whenever possible without negatively affecting devices relying on the network entity, such as camping user equipments. Likewise, it is beneficial for user equipments to be able to enable and maintain lower power modes, such as RRC idle and RRC inactive modes, more often while maintaining the ability to quickly connect to a wireless communications network, such as in an RRC connected mode. The techniques for managing energy saving mode transitions at a network entity described herein meet both of these aims.

User equipments may generally camp on to a network entity actively or passively. For example, a user equipment may connect to a network entity (e.g., establishing an RRC connected state) and then switch to an RRC inactive or RRC idle mode later, while still camping on the network entity. As another example, a user equipment may not even try to connect to the network entity, but may just camp on the network entity and rely on period broadcasts of certain signals from the network entity, such as SIBs and SSBs.

Figure 5:
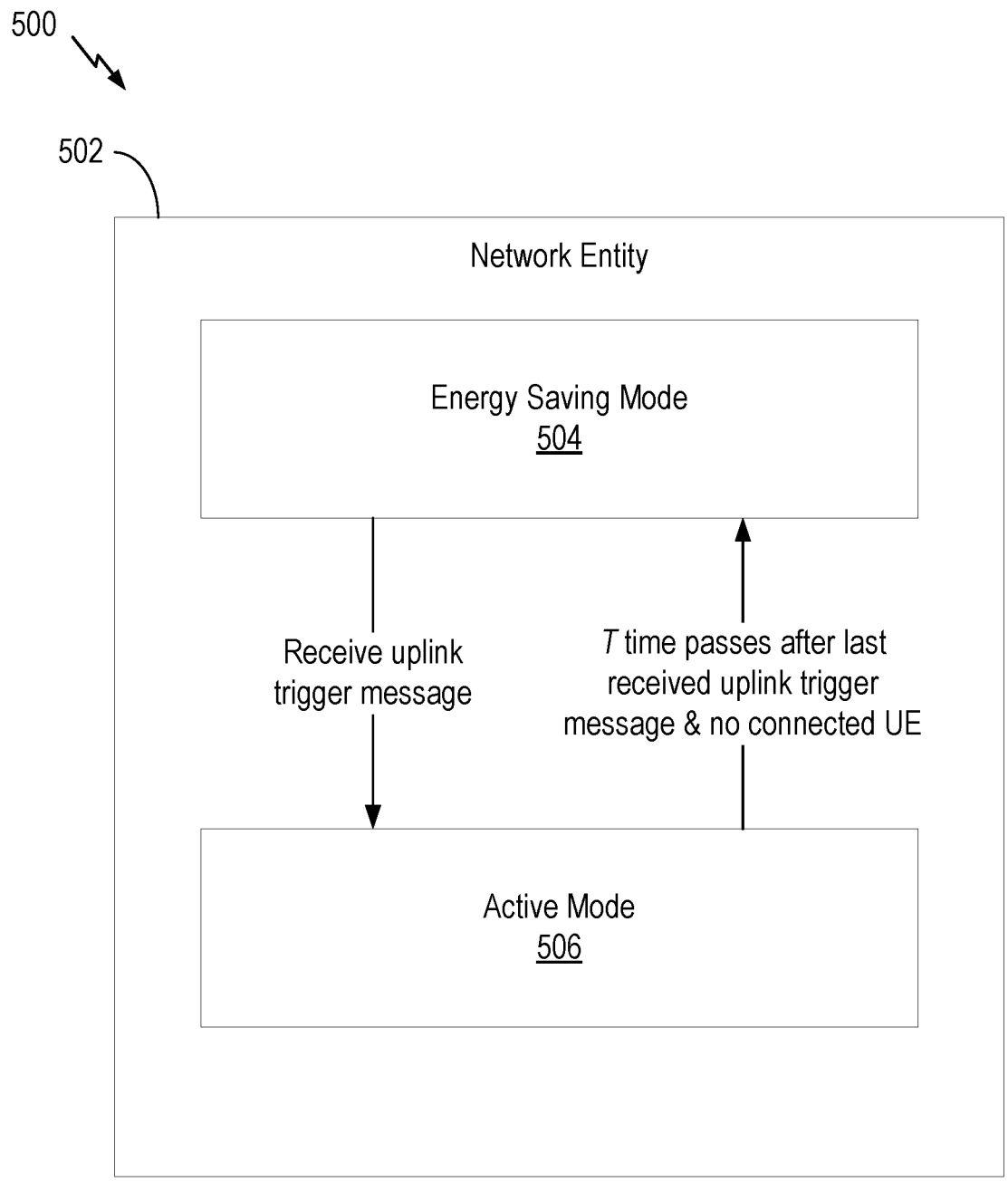
FIG. 5 depicts an example mode transition diagram for a network entity.

FIG. 5 depicts an example mode (or state) transition diagram 500 for a network entity 502, such as base station 102 of FIGS. 1 and 3, or a disaggregated base station as discussed with respect to FIG. 2.

Figure 7A:
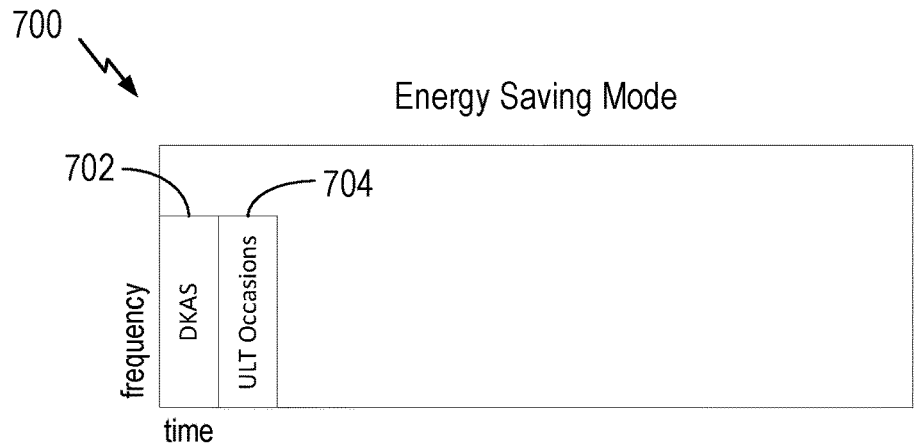
FIGS. 7A-7C depict examples of time and frequency resource allocations for different network entity modes.

As depicted, a network entity may be in an energy saving (or low power) mode 504 in which certain periodic broadcasts are deactivated, such as the broadcast of SIBs and/or SSBs, as well as certain non-periodic signals, such as paging. FIG. 7A, described further below, depicts an example of a reduced time and frequency resource allocation in an energy saving mode that may be used by network entity 502.

In energy saving mode 504, network entity 502 may reduce power use by deactivating, or reducing the frequency of, the broadcast of certain signals, such as SIBs, SSBs, paging, and others. Network entity 502 may further save energy by not monitoring for certain signals, such as not monitoring for RACH signals during RACH occasions.

In some aspects, network entity 502 may maintain the ability for user equipments to camp on by continuing to send downlink "keep-alive" signals. In some aspects, a downlink keep alive signal may be a standard downlink reference signal, or a simplified downlink reference signal, that can be used by a user equipment to discover network entity 502. For example, a standard downlink reference signal for synchronization is a synchronization signal block, which comprises four symbols (1 primary synchronization signal, 1 secondary synchronization signal, and two physical broadcast channel symbols. A simplified downlink reference signal for a keep-alive signal may comprise less information and/or fewer numbers of symbols (e.g., one or two of the aforementioned set of four). However, network entity 502 may also be configured to deactivate any periodic downlink signal in energy saving mode 504.

Generally, network entity 502 may maintain the energy saving mode 504 until such time as network entity 502 receives an uplink trigger message from a user equipment. An uplink trigger may be, for example, an initial uplink trigger message if a user equipment is initiating camping, or an uplink keep-alive-signal if the user equipment is maintaining camping. In some aspects, the uplink trigger message may be (or may be based on) a random access channel preamble format. In other aspects, the uplink trigger message may be based on a preconfigured uplink resource.

When network entity 502 is configured to deactivate (and thus not send) any periodic downlink signals in energy saving mode 504, a user equipment may need to send an uplink trigger message in multiple directions because the user equipment may not receive any signals from network entity 502 indicating its relative direction. This may be particularly useful when the user equipment is seeking to connect using higher frequency bands that are more sensitive to directionality.

Figure 7B:
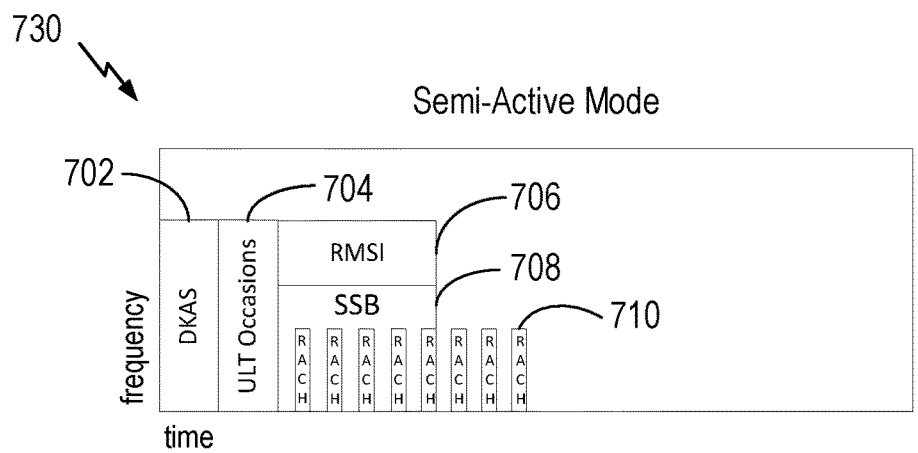
Figure 7C:
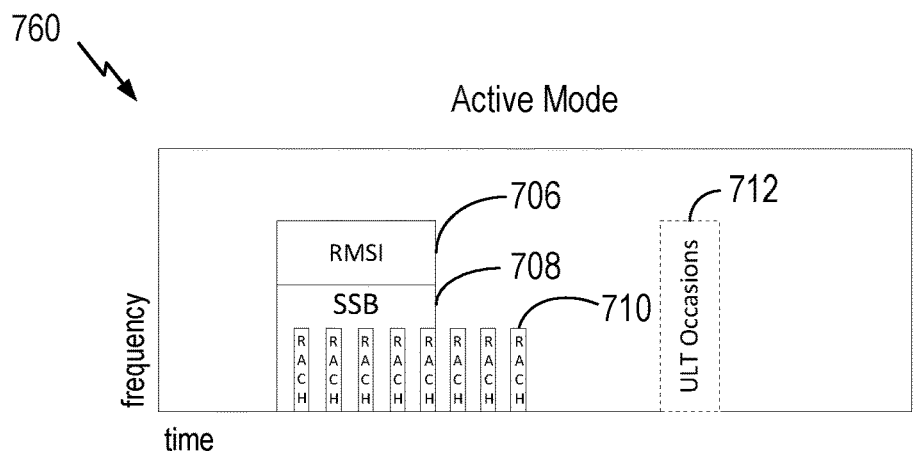

After receiving the uplink trigger message, network entity 502 transitions to active mode 506 in which periodic broadcasts, such as SIBs in SSBs, which were deactivated for energy saving mode 504, are reactivated. FIG. 7C, described further below, depicts an example of a time and frequency resource allocation in an active mode that may be used by network entity 502.

Generally, in active mode 506, network entity 502 may broadcast periodic signals, such as SIBs and SSBs, on a normal (e.g., pre-configured and/or standards-defined) schedule. Generally, in the active mode, network entity 502 may deactivate or discontinue certain broadcasts that are active during energy saving mode 504, such as the downlink keep-alive signal, because network entity 502 is already broadcasting other signals that perform the same or similar function (e.g., SSBs). However, in some aspects, network entity 502 may activate (or maintain) periodic occasions for monitoring for uplink keep-alive signals (as depicted in the example of FIG. 7C at 712). For example, if network entity 502 is already in active mode 506, it may be running a timer and upon expiry of such a timer it may deactivate its broadcast signals at least in some directions. Maintaining monitoring occasions for uplink keep-alive signals allows a user equipment camping on network entity 502 to indicate to network entity 502 that it should remain active, and this indication (e.g., by way of receiving an uplink keep-alive signal) may reset any currently running timer for mode transitions.

Further, the uplink keep-alive signal can be utilized to reduce the overhead of RMSI, RACH, paging, and the like. For example, network entity 502 may not send paging (or may deprioritize send paging) when it assumes there is no camping user equipment, such as when network entity 502 does not detect any uplink trigger signal. In some aspects, paging, RMSI, RACH, and the like may be supported only in the directions where network entity 502 detects (or has detected) uplink signals.

After entering active mode 506, network entity 502 may initiate a timer (or count-down) and monitor for any connecting user equipments or further uplink trigger messages. If, after a threshold period of time (7) no user equipments have connected to network entity 502 (e.g., entered RRC connected mode with respect to network entity 502), and no further uplink trigger messages have been received, then network entity 502 may return to energy saving mode 504. In some aspects, the threshold period is measured from receipt of the latest uplink trigger message, while in others aspects, the threshold period is measured from enabling active mode 506.

In some aspects, the threshold period of time (7) may be provided to a user equipment. For example, the threshold period of time (7) may be provided via SIB1 when network entity 502 is active mode 506, or by system information or other dedicated signals from a different network entity. As another example, the threshold period of time (7) may be preconfigured at the user equipment. These are just some examples, and others are possible. Knowing the threshold period of time (7) allows a user equipment to send uplink trigger messages, or other uplink signals, to network entity 502 on-time in order to keep network entity 502 from entering energy saving mode 504. For example, the user equipment may send uplink trigger messages to keep network entity 502 in active mode 506 in order that network entity 502 continue sending SSBs.

Note that the transitions between energy saving mode 504 and active mode 506 may be direction, cell, and/or beam-specific. For example, one cell of a base station may be in energy saving mode 504 while one or more other cells of the base station are in active mode 506. Similarly, in a disaggregated RAN context, one radio unit (RU) may be in energy saving mode 504 while one or more other RUs are in active mode 506. As yet another example, one or more beams (e.g., as defined by an SSB) may be deactivated in energy saving mode 504 while one or more other beams are active. In this way, the opportunities to enter energy saving mode 504 are maximized while maintaining ready access to a wireless communications network associated with network entity 502.

Figure 6:
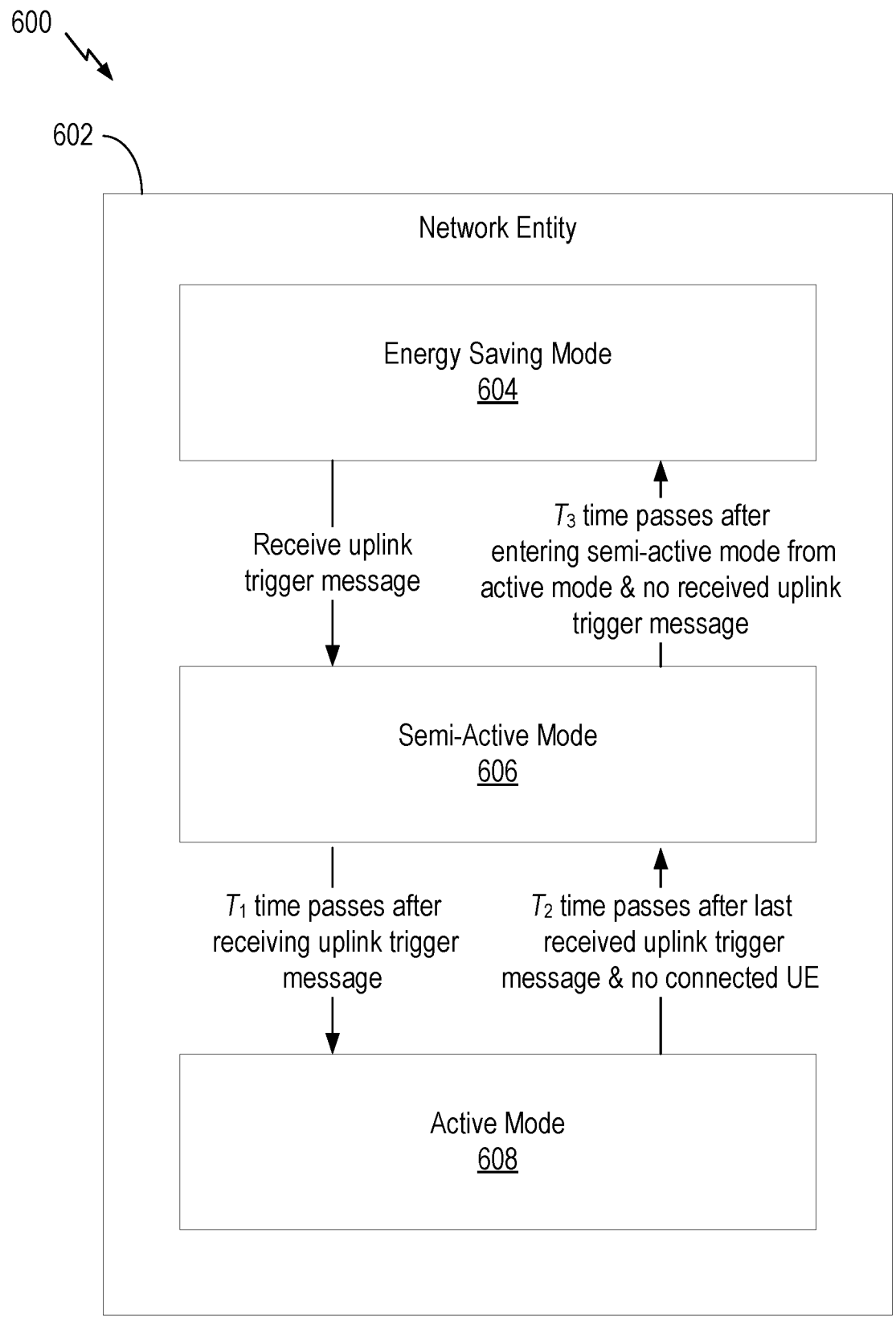
FIG. 6 depicts another example mode transition diagram for a network entity.

FIG. 6 depicts another example mode (or state) transition diagram 600 for a network entity 602, such as base station 102 of FIGS. 1 and 3, or a disaggregated base station as discussed with respect to FIG. 2.

Similar to the example of FIG. 5, network entity 602 may be in an energy saving (or low power) mode 604 in which certain periodic broadcasts are deactivated, such as the broadcast of SIBs and/or SSBs, as well as certain non-periodic signals, such as paging. FIG. 7A, described further below, depicts an example of a reduced time and frequency resource allocation in an energy saving mode that may be used by network entity 602.

Generally, network entity 602 may operate in energy saving mode 604 as described above with respect to energy saving mode 504 of FIG. 5.

Network entity 602 may maintain the energy saving mode 604 until such time as network entity 602 receives an uplink trigger message (as described above) from a user equipment. After receiving the uplink trigger message, network entity 602 transitions to an intermediate "semi-active" mode 606, which distinguishes this example from that of FIG. 5.

In the semi-active mode 606, network entity 602 may maintain certain broadcast and monitoring configurations from energy saving mode 604, such as broadcasting downlink keep-alive signals (e.g., 702 in FIG. 7B) and monitoring for uplink trigger messages (e.g., 704 in FIG. 7B), but may also activate broadcasts and monitoring opportunities configured for active mode 608. In this way, semi-active mode 606 may act as a soft transition mode that enables user equipments to complete certain procedures based on the behavior of network entity 602 in energy saving mode 604.

For example, abruptly shutting down downlink keep alive signals and uplink trigger monitoring in a direct move from energy saving mode 604 to active mode 608 may cause some issues for user equipments that are attempting to detect and/or measure network entity 502 because detection and measurement procedures are typically not one-shot procedures. For instance, a user equipment may have multiple receive beams to search over, and/or may need to perform multiple measurements and combine them to improve the user equipment's detection and/or measurement accuracy. Thus, if a user equipment were attempting to detect and measure downlink keep-alive signals across multiple periods of time and network entity 602 abruptly shuts down broadcast of those signals in the middle the user equipment's procedure, the procedure may fail. Accordingly, semi-active mode 606 may serve to "smooth" a transition between energy saving mode 604 and active mode 608. FIG. 7B, described further below, depicts an example of a time and frequency resource allocation in a semi-active mode that may be used by network entity 602.

After entering semi-active mode 606, network entity 602 may initiate a first timer (or count-down) that controls its transition to active mode 608. In this example, after a first threshold period of time ($T_1$), network entity transitions from semi-active mode to active mode 608. Note, that in some cases, network entity 602 may be configured with $T_1=0$ so that semi-active mode 606 is bypassed and network entity 602 transitions directly from energy saving mode 604 to active mode 608. Further, in other aspects, network entity 602 may be configured to return to energy saving mode 604 from semi-active mode 606 based on another configuration. For example, if $T_1$ and $T_2=0$, then network entity 602 will alternate between energy saving mode 604 and semi-active mode 606 only. Notably, other configurations using additional time-based and other mode switching logic are possible.

Generally, network entity 602 may operate in active mode 608 as described above with respect to active mode 506 of FIG. 5, including broadcasting periodic signals, such as SIBs and SSBs, and performing paging. Further, network entity 602 may monitor periodic uplink keep-alive signal occasions in active mode 608.

After entering active mode 608, network entity 602 may initiate a second timer (or count-down) and monitor for any connecting user equipments or further uplink trigger messages. If, after a second threshold period of time ($T_2$) no user equipments have connected to network entity 602, and no further uplink trigger messages have been received, then network entity 602 may return to semi-active mode 606. In some aspects, the second threshold period of time ($T_2$) is measured from receipt of the latest uplink trigger message, while in other aspects the second threshold period of time ($T_2$) is measured from enabling active mode 608.

After entering semi-active mode 606 from active mode 608, network entity 602 may initiate a third timer (or count-down) and monitor for any connecting user equipments or further uplink trigger messages. If, after a third threshold period of time ($T_3$) no user equipments have connected to network entity 602, and no further uplink trigger messages have been received, then network entity 602 may return to energy saving mode 604. In some aspects, the third threshold period of time ($T_3$) is measured from entering semi-active mode 606 from active mode 608. If, on the other hand, a further uplink trigger message is received while in the semi-active mode 606 (such as from a user equipment that is already camping on the cell and wanting to stay camped on the cell) and/or a connecting user equipment is detected while in the semi-active mode 606 (e.g., before the third threshold period of time $T_3$ expires), then network entity 602 may transition from semi-active mode 606 back to active mode 608. In such cases, network entity 602 may transition immediately back to active mode 608, or may initiate a new timer (or count-down) and transition to active mode 608 after the $T_1$ threshold period of time.

Note, that in some cases, network entity 602 may be configured with $T_3=0$ so that semi-active mode 606 is bypassed and network entity 602 transitions directly from active mode 608 to energy saving mode 604.

One or more of the aforementioned threshold periods of time, $T_1$, $T_2$, and $T_3$ may be provided to a user equipment in various manners, including via system information block (e.g., SIB1) when network entity 602 is active mode 608, or by system information or other dedicated signals from a different network entity. Alternatively, the threshold periods of time, $T_1$, $T_2$, and $T_3$ may be preconfigured, though preconfigured thresholds may also be updated by network entity 602. These are just some examples, and others are possible. As above, knowing the threshold periods of time, e.g., $T_1$, $T_2$, and/or $T_3$, allows a user equipment to send uplink trigger messages, or other uplink signals, to network entity 602 in order to keep network entity 602 from entering energy saving mode 604.

As above with the example of FIG. 5, here the transitions between energy saving mode 604, semi-active mode 606, and active mode 608 may be direction, cell, and/or beam-specific.

FIGS. 7A-7C depict examples of time and frequency resource allocations for different network entity modes.

In particular, FIG. 7A depicts an example 700 of time and frequency resources for an energy saving mode (such as energy saving modes 504 and 604 described above with respect to FIGS. 5 and 6, respectively), which includes a downlink keep-alive signal 702 as well as uplink trigger monitoring occasions 704. In this example energy saving mode, periodic broadcasts, such as SIB and SSBs, as well as monitoring occasions (e.g., for RACH) are deactivated, thus saving significant power.

FIG. 7B depicts an example 730 of time and frequency resources for a semi-active mode (such as semi-active mode 606 described above with respect to FIG. 6), which includes the resources of example 700 in addition to RSMI 706, SSB(s) 708, and RACH monitoring occasions 710. As described above, maintaining certain configurations from energy saving mode, as in the example 700, allows for a soft transition between energy saving mode and active mode, as in the example 760.

FIG. 7C depicts an example 760 of time and frequency resources for an active mode (such as active modes 506 and 608 described above with respect to FIGS. 5 and 6, respectively), which includes RSMI 706, SSB(s) 708, RACH monitoring occasions 710, and optional periodic uplink trigger monitoring occasions 712.

For example, when example 760 corresponds to active mode 506 of FIG. 5, the periodic uplink trigger monitoring occasions 712 may be included within the time and frequency resources. In other words, when example 760 corresponds to active mode 506 of FIG. 5, there may be periodic uplink trigger monitoring occasions 712 for the network entity 502 to monitor for ULT during the active mode. As another example, when example 760 corresponds to active mode 608 of FIG. 6, the periodic uplink trigger monitoring occasions 712 are not included within the time and frequency resources. In other words, when example 760 corresponds to active mode 608 of FIG. 6, the network entity 502 does not monitor for ULT during the active mode. Notably, in this example, the downlink keep-alive resources 702 and uplink monitoring occasion resources 704 are deactivated.

Notably, FIGS. 7A-7C are just a few examples, and other configurations using different selections and arrangements of resources are possible. For example, as described above, downlink keep-alive signals (e.g., 702) may not be implemented in other aspects. Further, in other aspects, deactivated signals (such as SIBs and SSBs in energy save mode) may instead be broadcast with reduced frequency (or at an increased interval).

Example Operations of Entities in a Communications Network

Figure 8:
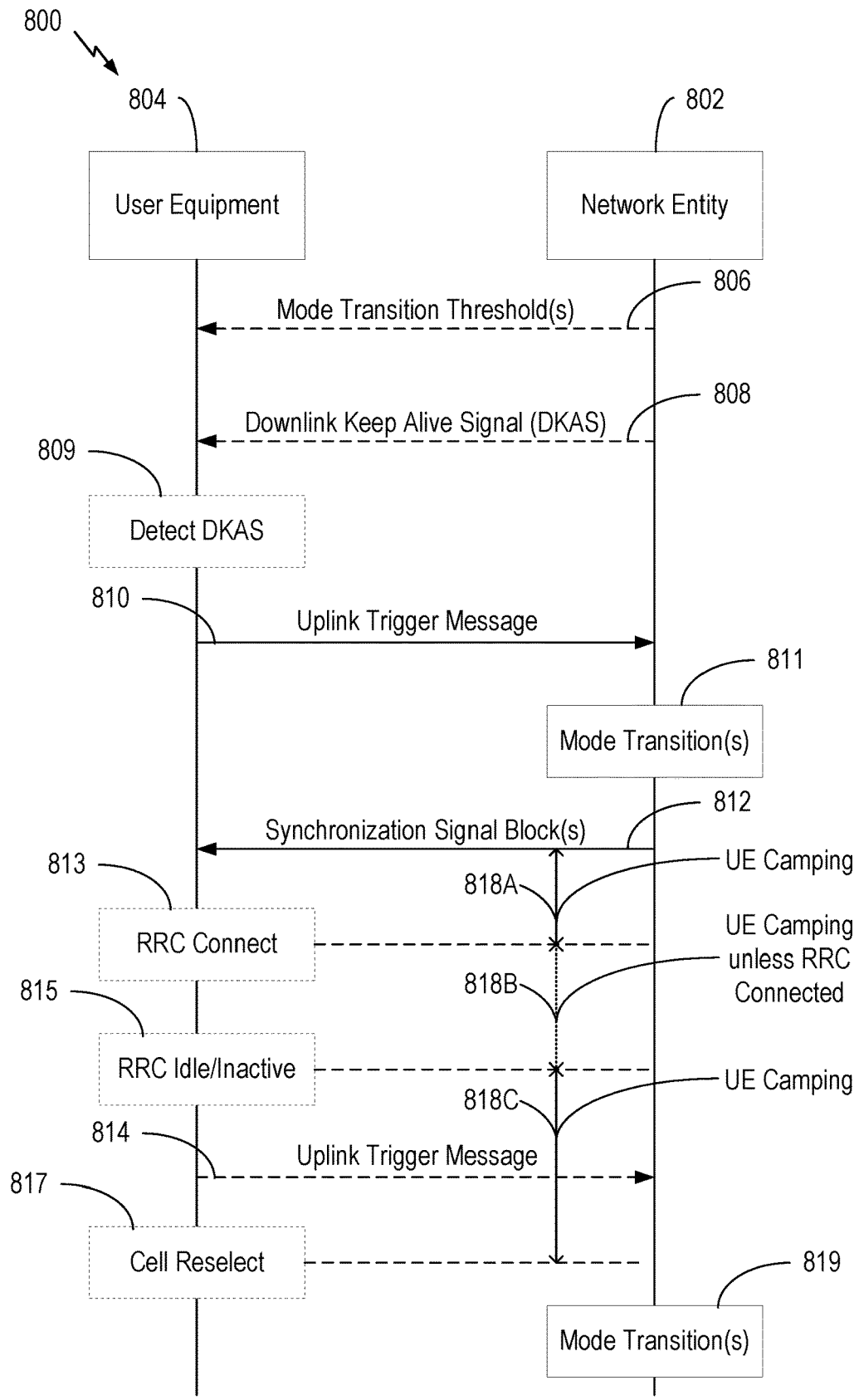
FIG. 8 depicts am example process flow for communications in a network between a network entity and a user equipment.

FIG. 8 depicts am example process flow 800 for communications in a network between a network entity 802 and a user equipment 804. In some aspects, the network entity 802 may be an example of the base station 102 depicted and described with respect to FIGS. 1 and 3 or a disaggregated base station depicted and described with respect to FIG. 2. Similarly, the user equipment 804 may be an example of user equipment 104 depicted and described with respect to FIGS. 1 and 3.

In this example, network entity 802 is initially in an energy saving mode.

Flow 800 begins at optional step 806 with transmitting information indicating one or more mode transition thresholds (e.g., T with respect to FIG. 5, or $T_1$, $T_2$, and/or $T_3$ with respect to FIG. 6). As above, in some aspects, the one or more mode threshold may be transmitted in a system information block (e.g., SIB1), in other system information, or in other dedicated signaling (e.g., in RRC, MAC-CE, or DCI).

Flow 800 then proceeds to optional step 808 with sending a downlink keep-alive signal. In some cases, the downlink keep-alive signal may be used by a user equipment (e.g., as a signal measurement resource) to stay camped on network entity 802.

Flow 800 then proceeds to optional step 809 in which, in the event a downlink keep-alive signal was transmitted by network entity 802, then user equipment may detect the downlink keep-alive signal. Detecting the downlink keep-alive signal at step 809 may help user equipment 804 detect and measure network entity 802 so that user equipment 804 may stay camped on network entity 802. User equipment 804 may further use the downlink keep-alive signal to determine a direction to send an uplink trigger message based on a direction from which it received the downlink keep-alive signal from network entity 802.

Flow 800 then proceeds to step 810 with user equipment 804 sending an uplink trigger message to network entity 802. As above, if user equipment 804 is not aware of a direction to send the uplink trigger message (e.g., if user equipment 804 has not received a signal from network entity 802 with which to determine a receive direction), then user equipment 804 may send uplink trigger messages in multiple directions.

Upon receiving the uplink trigger message from user equipment 804, network entity 802 may transition modes at step 811. For example, as in the example of FIG. 5, network entity 802 may transition from an energy saving mode to an active mode, or as in the example of FIG. 6, network entity 802 may transition from an energy saving mode to a semi-active mode (or an active mode directly, based on the setting for $T_1$). Note that while shown as a single step, step 811 may represent, for example, the transition to semi-active mode and then to active mode, as described above with respect to FIG. 6.

Flow 800 then proceeds to step 812 with network entity 802 sending SSB(s) to user equipment 804 while in a semi-active or active mode. As above, network entity 802 may send the SSBs only in a particular direction, or via a particular cell or beam associated with the direction from which network entity 802 received the uplink trigger message from user equipment 804. In this way, network entity 802 may keep other cells, beams, and/or directions in an energy saving mode.

After receiving the SSB(s), user equipment 804 may camp on network entity 802 during time intervals indicated by arrows 818A, 818B, and/or 818C.

After camping on network entity 802, user equipment 804 may connect to (e.g., become RRC connected with) network entity 802 at optional step 813. During interval 818B, network entity 802 would be serving user equipment 804, and thus user equipment would not be camping on network entity 802 during interval 818B. If user equipment 804 does connect to network entity 802, then user equipment does 804 may subsequently enter a lower power state, such as RRC idle or RRC inactive at optional step 815. In such cases, user equipment 804 begins to camp on network entity 802 during interval 818C.

If user equipment 804 received one or more mode transition thresholds at optional step 806, then user equipment 804 may monitor the appropriate time interval and send a further uplink trigger message at step 814 (e.g., an uplink keep-alive signal) in order to prevent network entity 802 from re-entering an energy saving mode. Alternatively, user equipment 804 may determine that network entity 802 is transitioning modes over time, or based on current broadcasts from network entity 802, and send an uplink trigger message at step 814 based on such determinations.

For example, user equipment may detect that both downlink keep-alive signals (e.g., 702 in FIG. 7B and SSBs (e.g., 708 in FIG. 7B) are being transmitted concurrently and may thus conclude that network entity is in a semi-active mode and trying to perform energy saving. As yet another alternative, network entity 802 may broadcast its energy saving mode and/or configuration (e.g., a mode transition configuration as described with respect to FIGS. 5 and 6) to user equipment 804 so that user equipment 804 may monitor modes and signal network entity 802 appropriately (e.g., to cause network entity 802 to stay in an active mode).

In some cases, user equipment 804 may be allowed to temporarily camp on network entity 802, based on downlink keep-alive signal measurements, for a threshold period of time (e.g., $T_4$), given that one or more conditions are met. For example, conditions could include network entity 802's signal strength and/or quality as measured via downlink keep-alive signal 808 and/or SSB(s) 812, the variation in those signals over time, and/or user equipment 804's mobility state.

In some cases, user equipment 804 may determine to perform an optional cell reselection at step 817 based on knowledge that network entity 802, which user equipment 804 is currently camping on, is attempting to enter a power savings mode, while a neighboring network entity (not depicted) is not. This may be true even if the neighboring network entity has weaker signal characteristics. If user equipment 804 determines to perform a cell reselection at step 817, then user equipment 804 may be expected to not send any additional uplink trigger messages (e.g., uplink keep-alive signals) to network entity 802.

Flow 800 finally proceeds to step 819 with network entity 802 transitioning modes again, such as back to an energy saving mode.

Figure 9:
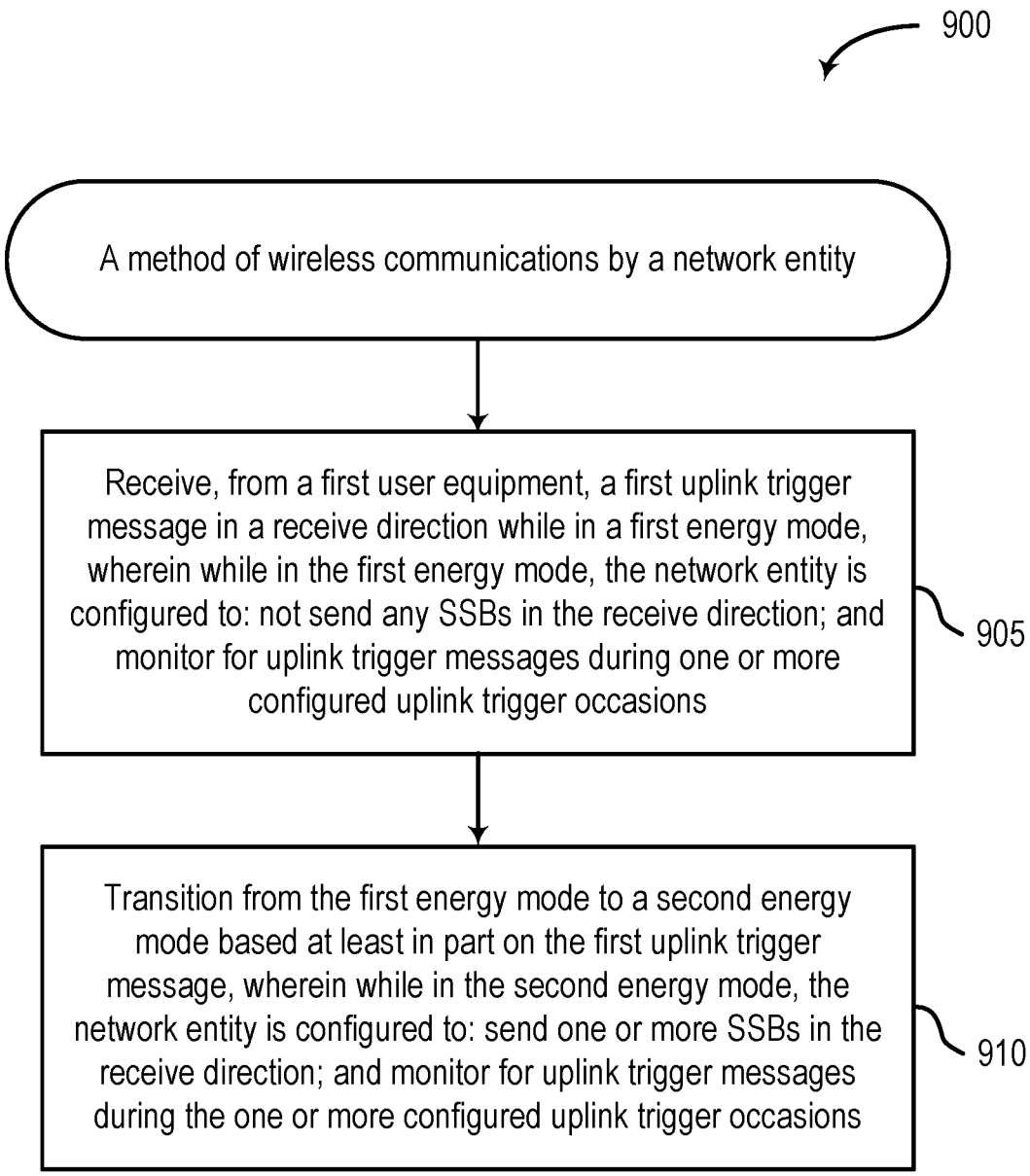
FIG. 9 depicts a method for wireless communications.

Note that while FIG. 8 depicts a single network entity 802 interacting with a use equipment 804, in some configurations, network entities (and the network at large) may cooperate in managing the transition of network entities between modes. Some prior coordination among network entities (e.g., different cells/DUs/CUs/OAM) may be supported to decide the transition configuration (e.g., threshold on uplink trigger message strength/quality, number of detected uplink trigger messages, a timer for switching, etc.). Before a mode transition, a particular network entity (e.g., 802) may coordinate with other network entities (different cells/DUs/CUs/OAM) to decide whether the particular network entity should transition or not (and the associated configuration—e.g., after what time period). Note that uplink trigger-based signal strength and/or quality may be used a metric in the transition criteria Example Operations of a Network Entity FIG. 9 shows an example of a method 900 for wireless communications by a network entity, such as BS 102 of FIGS. 1 and 3, or a disaggregated base station as discussed with respect to FIG. 2.

Method 900 begins at step 905 with receiving, from a first user equipment, a first uplink trigger message in a receive direction while in a first energy mode, wherein while in the first energy mode, the network entity is configured to: deactivate (e.g., not send) any SSBs in the receive direction; and monitor for uplink trigger messages during one or more configured uplink trigger occasions. In some cases, the operations of this step refer to, or may be performed by, circuitry for receiving and/or code for receiving as described with reference to FIG. 11.

Method 900 then proceeds to step 910 with transitioning from the first energy mode to a second energy mode based at least in part on the first uplink trigger message, wherein while in the second energy mode, the network entity is configured to: activate (e.g., to send) one or more SSBs in the receive direction; and monitor for uplink trigger messages during the one or more configured uplink trigger occasions. For example, transitioning from the first energy mode to a second energy mode may include transitioning from energy saving mode 504 to active mode 506. As another example, transitioning form the first energy mode to a second energy mode may include transitioning from energy saving mode 604 to semi-active mode 606. In some cases, the operations of this step refer to, or may be performed by, circuitry for transitioning and/or code for transitioning as described with reference to FIG. 11.

In some aspects, while in the first energy mode, the network entity is configured to perform one or more of: increasing an interval for, or deactivate, one or more system information block broadcasts; increasing an interval for, or deactivate, synchronization signal block broadcasts; increasing an interval for, or deactivate, paging; or increasing an interval for, or deactivate, random access channel (RACH) monitoring occasions.

In some aspects, the network entity is further configured to send a downlink keep alive signal during a configured downlink keep alive signal occasion while in the first energy mode. In some aspects, the downlink keep alive signal comprises a downlink reference signal.

In some aspects, the first uplink trigger message comprises an uplink keep alive signal. In some aspects, the first uplink trigger message is based on a random access channel preamble format.

In some aspects, the method 900 further includes transitioning from the second energy mode to a third energy mode based at least in part on a first threshold period of time passing after entering the second energy mode, wherein while in the third energy mode, the network entity is configured to: activate the one or more SSBs in the receive direction; and not monitor for uplink trigger messages during the one or more configured uplink trigger occasions. In some cases, the operations of this step refer to, or may be performed by, circuitry for transitioning and/or code for transitioning as described with reference to FIG. 11.

In some aspects, the method 900 further includes transitioning from the third energy mode to the second energy mode based at least in part on: a second threshold period of time passing without a UE being connected to the network entity; and a third threshold period of time passing after receiving the first uplink trigger message from the first user equipment. In some cases, the operations of this step refer to, or may be performed by, circuitry for transitioning and/or code for transitioning as described with reference to FIG. 11.

In some aspects, the method 900 further includes transitioning from the second energy mode to the first energy mode based at least in part on a fourth threshold period of time passing without receiving any uplink trigger message. In some cases, the operations of this step refer to, or may be performed by, circuitry for transitioning and/or code for transitioning as described with reference to FIG. 11.

In some aspects, the method 900 further includes sending a system information block message comprising one or more of: an indication of the first threshold period of time; an indication of the second threshold period of time; an indication of the third threshold period of time; or an indication of the fourth threshold period of time. In some cases, the operations of this step refer to, or may be performed by, circuitry for sending and/or code for sending as described with reference to FIG. 11.

In some aspects, the method 900 further includes transitioning from the second energy mode to the first energy mode based at least in part on a threshold period of time passing after receiving the first uplink trigger message without a user equipment being connected to the network entity. In some cases, the operations of this step refer to, or may be performed by, circuitry for transitioning and/or code for transitioning as described with reference to FIG. 11.

In some aspects, the method 900 further includes sending a system information block message comprising an indication of the threshold period of time. In some cases, the operations of this step refer to, or may be performed by, circuitry for sending and/or code for sending as described with reference to FIG. 11.

Figure 11:
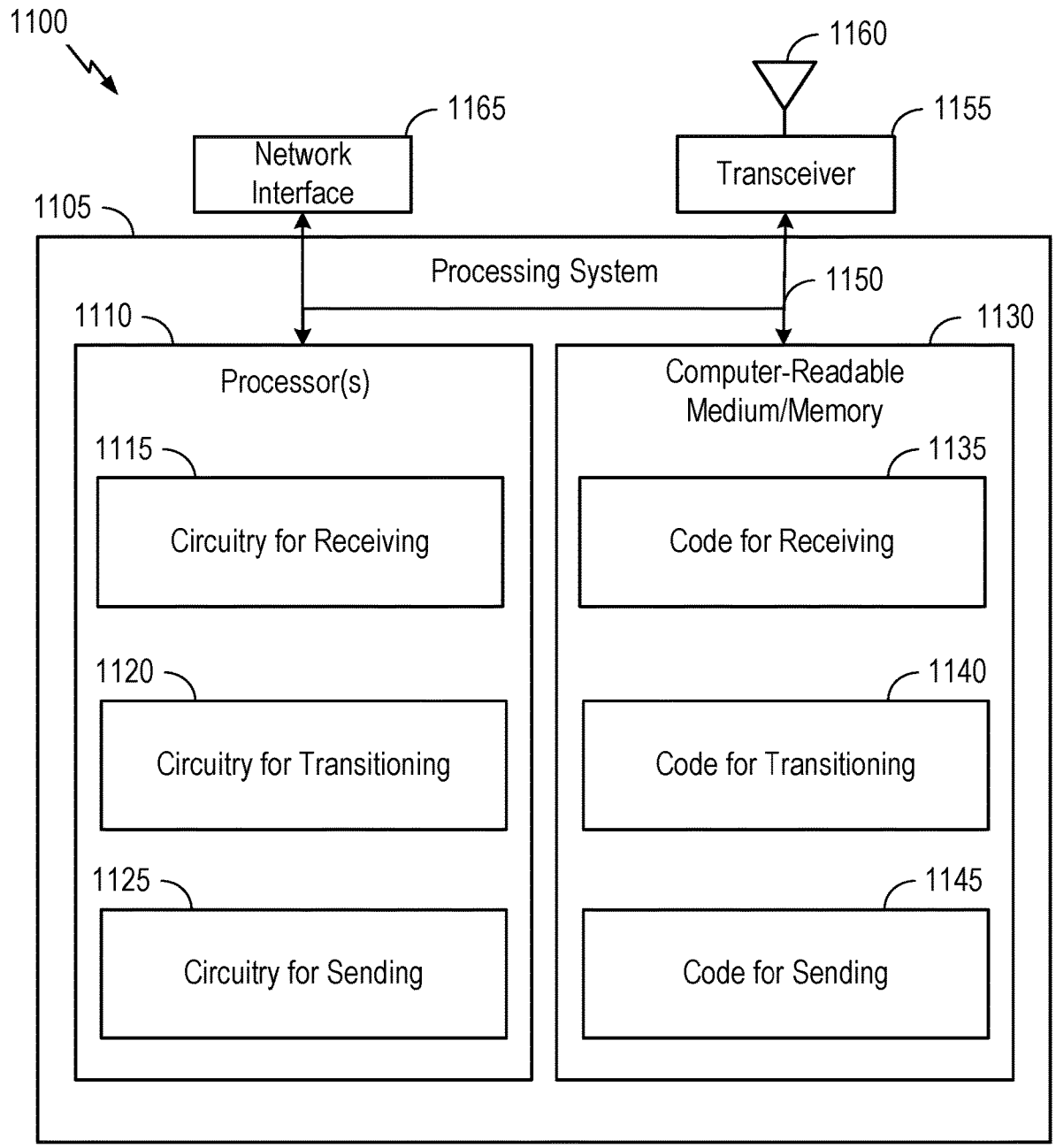
FIG. 11 depicts aspects of an example communications device.

In one aspect, method 900, or any aspect related to method 900, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Operations of a User Equipment

Figure 10:
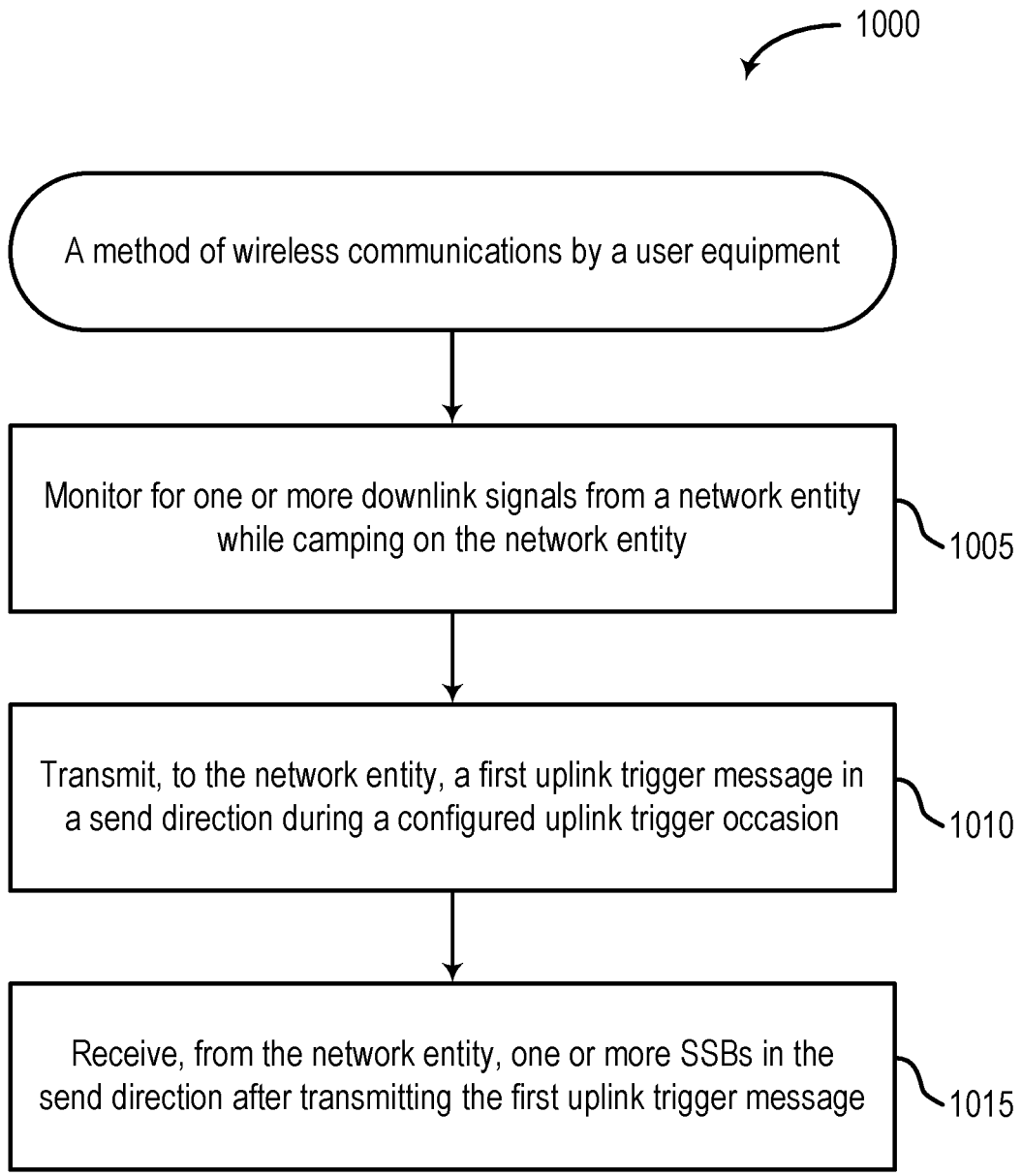
FIG. 10 depicts another method for wireless communications.

FIG. 10 shows an example of a method 1000 for wireless communications by a UE, such as UE 104 of FIGS. 1 and 3.

Method 1000 begins at step 1005 with monitoring for one or more downlink signals from a network entity while camping on the network entity. In some cases, the operations of this step refer to, or may be performed by, circuitry for monitoring and/or code for monitoring as described with reference to FIG. 12.

Method 1000 then proceeds to step 1010 with transmitting, to the network entity, a first uplink trigger message in a send direction during a configured uplink trigger occasion. In some cases, the operations of this step refer to, or may be performed by, circuitry for transmitting and/or code for transmitting as described with reference to FIG. 12.

Method 1000 then proceeds to step 1015 with receiving, from the network entity, one or more SSBs in the send direction after transmitting the first uplink trigger message. In some cases, the operations of this step refer to, or may be performed by, circuitry for receiving and/or code for receiving as described with reference to FIG. 12.

In some aspects, the first uplink trigger message comprises an uplink keep alive signal. In some aspects, the first uplink trigger message is based on a random access channel preamble format.

In some aspects, the method 1000 further includes receiving, from the network entity, a downlink keep alive signal during a configured downlink keep alive signal occasion. In some cases, the operations of this step refer to, or may be performed by, circuitry for receiving and/or code for receiving as described with reference to FIG. 12.

In some aspects, the method 1000 further includes determining that the network entity is in a semi-active mode based on receiving the one or more SSBs and the downlink keep alive signal within a threshold period of time. In some cases, the operations of this step refer to, or may be performed by, circuitry for determining and/or code for determining as described with reference to FIG. 12.

In some aspects, the downlink keep alive signal comprises a downlink reference signal.

In some aspects, the method 1000 further includes camping on the network entity based on one or more of: a signal quality indicator measured based on one or more of the one or more SSBs and the downlink keep alive signal; a mobility state of the user equipment; or a variation of a signal quality over a configured time interval. In some cases, the operations of this step refer to, or may be performed by, circuitry for camping and/or code for camping as described with reference to FIG. 12.

In some aspects, the method 1000 further includes selecting a new serving network entity based on information indicating that the network entity is to enter an energy saving mode. In some cases, the operations of this step refer to, or may be performed by, circuitry for selecting and/or code for selecting as described with reference to FIG. 12.

In some aspects, the method 1000 further includes receiving the information indicating that the network entity is to enter an energy saving mode via a system information message. In some cases, the operations of this step refer to, or may be performed by, circuitry for receiving and/or code for receiving as described with reference to FIG. 12.

In some aspects, the method 1000 further includes receiving the information indicating that the network entity is to enter an energy saving mode via a radio resource control message. In some cases, the operations of this step refer to, or may be performed by, circuitry for receiving and/or code for receiving as described with reference to FIG. 12.

In some aspects, the method 1000 further includes receiving, from the network entity, an indication that the network entity is configured to: activate one or more SSBs in the send direction; and monitor for uplink trigger messages during one or more configured uplink trigger occasions. In some cases, the operations of this step refer to, or may be performed by, circuitry for receiving and/or code for receiving as described with reference to FIG. 12.

In some aspects, the method 1000 further includes receiving, from the network entity, an indication of a threshold period of time after which the network entity will cease sending the one or more SSBs in the send direction. In some cases, the operations of this step refer to, or may be performed by, circuitry for receiving and/or code for receiving as described with reference to FIG. 12.

In some aspects, the indication of a threshold period of time after which the network entity will cease sending the one or more SSBs in the send direction is comprised within a system information block message.

In some aspects, the threshold period of time is based on a time of transmitting the first uplink trigger message.

In some aspects, the method 1000 further includes sending, to the network entity, a second uplink trigger message prior to an expiration of the threshold period of time. In some cases, the operations of this step refer to, or may be performed by, circuitry for sending and/or code for sending as described with reference to FIG. 12.

In some aspects, the second uplink trigger message is sent during a preconfigured periodic occasion.

Figure 12:
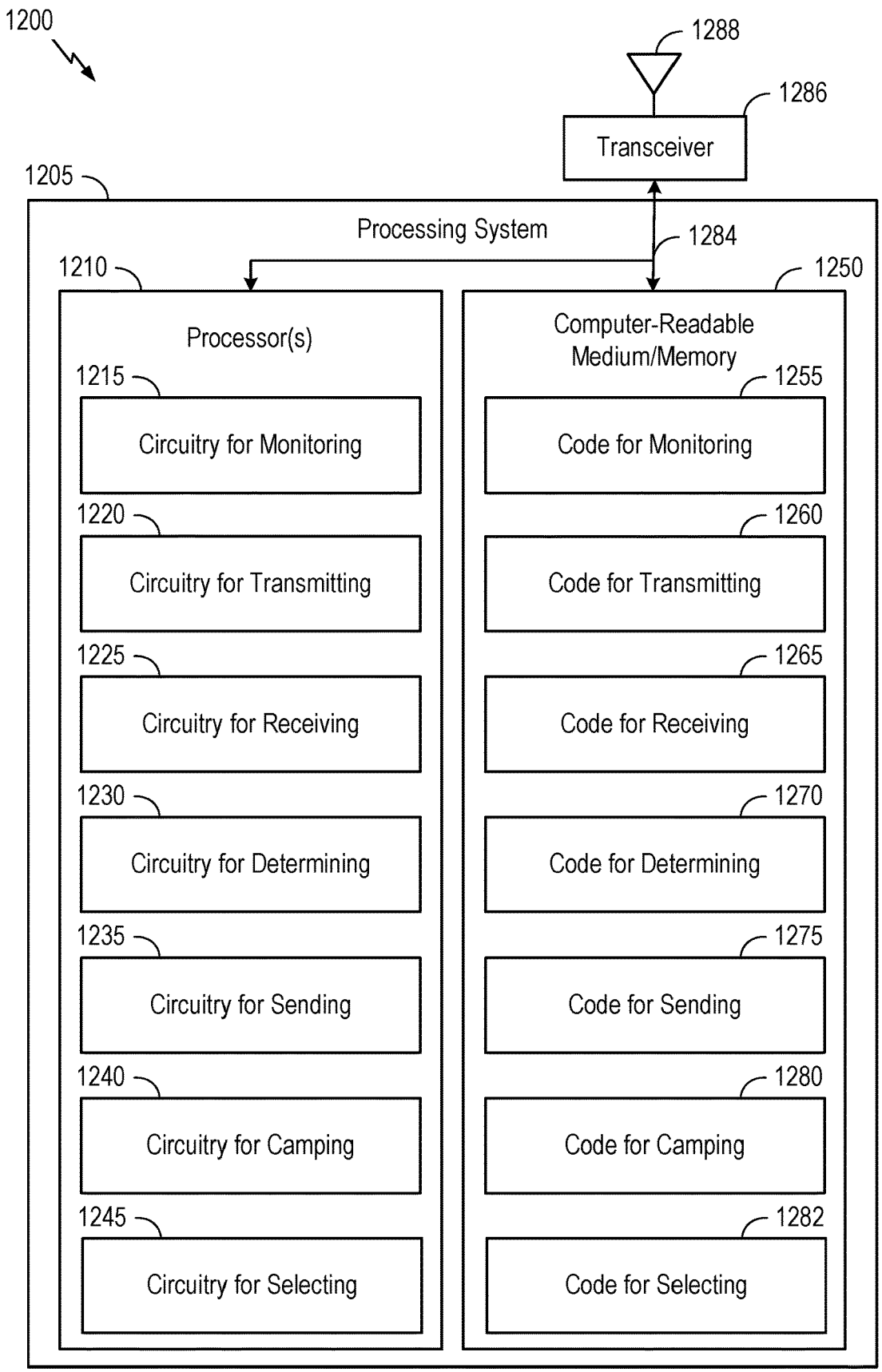
FIG. 12 depicts aspects of another example communications device.

In one aspect, method 1000, or any aspect related to method 1000, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Communications Devices

FIG. 11 depicts aspects of an example communications device 1100. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1155 (e.g., a transmitter and/or a receiver) and/or a network interface 1165. The transceiver 1155 is configured to transmit and receive signals for the communications device 1100 via the antenna 1160, such as the various signals as described herein. The network interface 1165 is configured to obtain and send signals for the communications device 1100 via communication link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1130 via a bus 1150. In certain aspects, the computer-readable medium/memory 1130 is configured to store instructions (e.g., computer-executable code) that when executed by the one or more processors 1110, cause the one or more processors 1110 to perform the method 900 described with respect to FIG. 9, or any aspect related to method 900. Note that reference to a processor of communications device 1100 performing a function may include one or more processors 1110 of communications device 1100 performing that function.

In the depicted example, the computer-readable medium/memory 1130 stores code (e.g., executable instructions), such as code for receiving 1135, code for transitioning 1140, and code for sending 1145. Processing of the code for receiving 1135, code for transitioning 1140, and code for sending 1145 may cause the communications device 1100 to perform the method 900 described with respect to FIG. 9, or any aspect related to method 900.

The one or more processors 1110 include circuitry configured to implement (e.g., execute) the code stored in the computer-readable medium/memory 1130, including circuitry such as circuitry for receiving 1115, circuitry for transitioning 1120, and circuitry for sending 1125. Processing with circuitry for receiving 1115, circuitry for transitioning 1120, and circuitry for sending 1125 may cause the communications device 1100 to perform the method 900 as described with respect to FIG. 9, or any aspect related to method 900.

Various components of the communications device 1100 may provide means for performing the method 900 as described with respect to FIG. 9, or any aspect related to method 900. Means for transmitting, sending or outputting for transmission may include transceivers 332 and/or antenna(s) 334 of the BS 102 illustrated in FIG. 3 and/or the transceiver 1155 and the antenna 1160 of the communications device 1100 in FIG. 11. Means for receiving or obtaining may include transceivers 332 and/or antenna(s) 334 of the BS 102 illustrated in FIG. 3 and/or the transceiver 1155 and the antenna 1160 of the communications device 1100 in FIG. 11.

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to the transceiver 1286 (e.g., a transmitter and/or a receiver). The transceiver 1286 is configured to transmit and receive signals for the communications device 1200 via the antenna 1288, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1250 via a bus 1284. In certain aspects, the computer-readable medium/memory 1250 is configured to store instructions (e.g., computer-executable code) that when executed by the one or more processors 1210, cause the one or more processors 1210 to perform the method 1000 described with respect to FIG. 10, or any aspect related to method 1000. Note that reference to a processor performing a function of communications device 1200 may include one or more processors 1210 performing that function of communications device 1200.

In the depicted example, computer-readable medium/memory 1250 stores code (e.g., executable instructions), such as code for monitoring 1255, code for transmitting 1260, code for receiving 1265, code for determining 1270, code for sending 1275, code for camping 1280, and code for selecting 1282. Processing of the code for monitoring 1255, code for transmitting 1260, code for receiving 1265, code for determining 1270, code for sending 1275, code for camping 1280, and code for selecting 1282 may cause the communications device 1200 to perform the method 1000 described with respect to FIG. 10, or any aspect related to method 1000.

The one or more processors 1210 include circuitry configured to implement (e.g., execute) the code stored in the computer-readable medium/memory 1250, including circuitry such as circuitry for monitoring 1215, circuitry for transmitting 1220, circuitry for receiving 1225, circuitry for determining 1230, circuitry for sending 1235, circuitry for camping 1240, and circuitry for selecting 1245. Processing with circuitry for monitoring 1215, circuitry for transmitting 1220, circuitry for receiving 1225, circuitry for determining 1230, circuitry for sending 1235, circuitry for camping 1240, and circuitry for selecting 1245 may cause the communications device 1200 to perform the method 1000 described with respect to FIG. 10, or any aspect related to method 1000.

Various components of the communications device 1200 may provide means for performing the method 1000 described with respect to FIG. 10, or any aspect related to method 1000. For example, means for transmitting, sending or outputting for transmission may include transceivers 354 and/or antenna(s) 352 of the UE 104 illustrated in FIG. 3 and/or the transceiver 1286 and the antenna 1288 of the communications device 1200 in FIG. 12. Means for receiving or obtaining may include transceivers 354 and/or antenna(s) 352 of the UE 104 illustrated in FIG. 3 and/or the transceiver 1286 and the antenna 1288 of the communications device 1200 in FIG. 12.

Example Clauses

Implementation examples are described in the following numbered clauses:

Clause 1: A method of wireless communications by a network entity, comprising: receiving, from a first user equipment, a first uplink trigger message in a receive direction while in a first energy mode, wherein while in the first energy mode, the network entity is configured to: deactivate any SSBs in the receive direction; monitor for uplink trigger messages during one or more configured uplink trigger occasions; and transitioning from the first energy mode to a second energy mode based at least in part on the first uplink trigger message, wherein while in the second energy mode, the network entity is configured to: activate one or more SSBs in the receive direction; and monitor for uplink trigger messages during the one or more configured uplink trigger occasions.

Clause 2: The method of Clause 1, wherein while in the first energy mode, the network entity is configured to perform one or more of: increasing an interval for, or deactivate, one or more system information block broadcasts; increasing an interval for, or deactivate, synchronization signal block broadcasts; increasing an interval for, or deactivate, paging; or increasing an interval for, or deactivate, random access channel (RACH) monitoring occasions.

Clause 3: The method of any one of Clauses 1 and 2, wherein the network entity is further configured to send a downlink keep alive signal during a configured downlink keep alive signal occasion while in the first energy mode.

Clause 4: The method of Clause 3, wherein the downlink keep alive signal comprises a downlink reference signal.

Clause 5: The method of any one of Clauses 1-4, wherein the first uplink trigger message comprises an uplink keep alive signal.

Clause 6: The method of any one of Clauses 1-5, wherein the first uplink trigger message is based on a random access channel preamble format.

Clause 7: The method of any one of Clauses 1-6, further comprising transitioning from the second energy mode to a third energy mode based at least in part on a first threshold period of time passing after entering the second energy mode, wherein while in the third energy mode, the network entity is configured to: activate the one or more SSBs in the receive direction; and not monitor for uplink trigger messages during the one or more configured uplink trigger occasions.

Clause 8: The method of Clause 7, further comprising transitioning from the third energy mode to the second energy mode based at least in part on: a second threshold period of time passing without a UE being connected to the network entity; and a third threshold period of time passing after receiving the first uplink trigger message from the first user equipment.

Clause 9: The method of Clause 8, further comprising transitioning from the second energy mode to the first energy mode based at least in part on a fourth threshold period of time passing without receiving any uplink trigger message.

Clause 10: The method of Clause 9, further comprising sending a system information block message comprising one or more of: an indication of the first threshold period of time; an indication of the second threshold period of time; an indication of the third threshold period of time; or an indication of the fourth threshold period of time.

Clause 11: The method of any one of Clauses 1-10, further comprising transitioning from the second energy mode to the first energy mode based at least in part on a threshold period of time passing after receiving the first uplink trigger message without a user equipment being connected to the network entity.

Clause 12: The method of Clause 11, further comprising sending a system information block message comprising an indication of the threshold period of time.

Clause 13: A method of wireless communications by a user equipment, comprising: monitoring for one or more downlink signals from a network entity while camping on the network entity; transmitting, to the network entity, a first uplink trigger message in a send direction during a configured uplink trigger occasion; and receiving, from the network entity, one or more SSBs in the send direction after transmitting the first uplink trigger message.

Clause 14: The method of Clause 13, wherein the first uplink trigger message comprises an uplink keep alive signal.

Clause 15: The method of any one of Clauses 13 and 14, wherein the first uplink trigger message is based on a random access channel preamble format.

Clause 16: The method of any one of Clauses 13-15, further comprising receiving, from the network entity, a downlink keep alive signal during a configured downlink keep alive signal occasion.

Clause 17: The method of Clause 16, further comprising determining that the network entity is in a semi-active mode based on receiving the one or more SSBs and the downlink keep alive signal within a threshold period of time.

Clause 18: The method of Clause 16, wherein the downlink keep alive signal comprises a downlink reference signal.

Clause 19: The method of Clause 16, further comprising camping on the network entity based on one or more of: a signal quality indicator measured based on one or more of the one or more SSBs and the downlink keep alive signal; a mobility state of the user equipment; or a variation of a signal quality over a configured time interval.

Clause 20: The method of Clause 16, further comprising selecting a new serving network entity based on information indicating that the network entity is to enter an energy saving mode.

Clause 21: The method of Clause 20, further comprising receiving the information indicating that the network entity is to enter an energy saving mode via a system information message.

Clause 22: The method of Clause 20, further comprising receiving the information indicating that the network entity is to enter an energy saving mode via a radio resource control message.

Clause 23: The method of any one of Clauses 13-22, further comprising receiving, from the network entity, an indication that the network entity is configured to: activate one or more SSBs in the send direction; and monitor for uplink trigger messages during one or more configured uplink trigger occasions.

Clause 24: The method of any one of Clauses 13-23, further comprising receiving, from the network entity, an indication of a threshold period of time after which the network entity will cease sending the one or more SSBs in the send direction.

Clause 25: The method of Clause 24, wherein the indication of a threshold period of time after which the network entity will cease sending the one or more SSBs in the send direction is comprised within a system information block message.

Clause 26: The method of Clause 24, wherein the threshold period of time is based on a time of transmitting the first uplink trigger message.

Clause 27: The method of Clause 24, further comprising sending, to the network entity, a second uplink trigger message prior to an expiration of the threshold period of time.

Clause 28: The method of Clause 27, wherein the second uplink trigger message is sent during a preconfigured periodic occasion.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network entity configured for wireless communication, comprising: a memory comprising computer-executable instructions; and one or more processors configured to execute the computer-executable instructions and cause the network entity to:
receive, from a first user equipment, a first uplink trigger message in a receive direction while in a first energy mode, wherein while in the first energy mode, the network entity is configured to:
deactivate any synchronization signal blocks (SSBs) in the receive direction;
monitor for uplink trigger messages during one or more configured uplink trigger occasions;
transition from the first energy mode to a second energy mode based at least in part on the first uplink trigger message, wherein while in the second energy mode, the network entity is configured to:
send one or more SSBs in the receive direction; and
monitor for uplink trigger messages during the one or more configured uplink trigger occasions.

2. The network entity of claim 1, wherein while in the first energy mode, the network entity is configured to perform one or more of:
increasing an interval for, or deactivate, one or more system information block broadcasts;
increasing an interval for, or deactivate, synchronization signal block broadcasts;
increasing an interval for, or deactivate, paging; or
increasing an interval for, or deactivate, random access channel (RACH) monitoring occasions.

3. The network entity of claim 1, wherein the network entity is further configured to send a downlink keep alive signal during a configured downlink keep alive signal occasion while in the first energy mode.

4. The network entity of claim 3, wherein the downlink keep alive signal comprises a downlink reference signal.

5. The network entity of claim 1, wherein the first uplink trigger message comprises an uplink keep alive signal.

6. The network entity of claim 1, wherein the first uplink trigger message is based on a random access channel preamble format.

7. The network entity of claim 1, wherein the one or more processors are configured to execute the computer-executable instructions and further cause the network entity to transition from the second energy mode to a third energy mode based at least in part on a first threshold period of time passing after entering the second energy mode, wherein while in the third energy mode, the network entity is configured to:
send the one or more SSBs in the receive direction; and
not monitor for uplink trigger messages during the one or more configured uplink trigger occasions.

8. The network entity of claim 7, wherein the one or more processors are configured to execute the computer-executable instructions and further cause the network entity to transition from the third energy mode to the second energy mode based at least in part on:
a second threshold period of time passing without a UE being connected to the network entity; and
a third threshold period of time passing after receiving the first uplink trigger message from the first user equipment.

9. The network entity of claim 8, wherein the one or more processors are configured to execute the computer-executable instructions and further cause the network entity to transition from the second energy mode to the first energy mode based at least in part on a fourth threshold period of time passing without receiving any uplink trigger message.

10. The network entity of claim 9, wherein the one or more processors are configured to execute the computer-executable instructions and further cause the network entity to send a system information block message comprising one or more of:
an indication of the first threshold period of time;
an indication of the second threshold period of time;
an indication of the third threshold period of time; or
an indication of the fourth threshold period of time.

11. The network entity of claim 1, wherein the one or more processors are configured to execute the computer-executable instructions and further cause the network entity to transition from the second energy mode to the first energy mode based at least in part on a threshold period of time passing after receiving the first uplink trigger message without a user equipment being connected to the network entity.

12. The network entity of claim 11, wherein the one or more processors are configured to execute the computer-executable instructions and further cause the network entity to send a system information block message comprising an indication of the threshold period of time.

13. A method of wireless communications by a network entity, comprising:
receiving, from a first user equipment, a first uplink trigger message in a receive direction while in a first energy mode, wherein while in the first energy mode, the network entity is configured to:
deactivate any synchronization signal blocks (SSBs) in the receive direction;
monitor for uplink trigger messages during one or more configured uplink trigger occasions;
transitioning from the first energy mode to a second energy mode based at least in part on the first uplink trigger message, wherein while in the second energy mode, the network entity is configured to:
send one or more SSBs in the receive direction; and
monitor for uplink trigger messages during the one or more configured uplink trigger occasions.

14. A user equipment configured for wireless communication, comprising: a memory comprising computer-executable instructions; and one or more processors configured to execute the computer-executable instructions and cause the user equipment to:

monitor for one or more downlink signals from a network entity while camping on the network entity;

transmit, to the network entity, a first uplink trigger message in a send direction during a configured uplink trigger occasion;

receive, from the network entity, one or more SSBs in the send direction after transmitting the first uplink trigger message; and receive, from the network entity, an indication of a threshold period of time after which the network entity will cease sending the one or more SSBs in the send direction.

15. The user equipment of claim 14, wherein the first uplink trigger message comprises an uplink keep alive signal.

16. The user equipment of claim 14, wherein the first uplink trigger message is based on a random access channel preamble format.

17. The user equipment of claim 14, wherein the one or more processors are configured to execute the computer-executable instructions and further cause the user equipment to receive, from the network entity, a downlink keep alive signal during a configured downlink keep alive signal occasion.

18. The user equipment of claim 17, wherein the one or more processors are configured to execute the computer-executable instructions and further cause the user equipment to determine that the network entity is in a semi-active mode based on receiving the one or more SSBs and the downlink keep alive signal within a threshold period of time.

19. The user equipment of claim 17, wherein the downlink keep alive signal comprises a downlink reference signal.

20. The user equipment of claim 17, wherein the one or more processors are configured to execute the computer-executable instructions and further cause the user equipment to camp on the network entity based on one or more of:
a signal quality indicator measured based on one or more of the one or more SSBs and the downlink keep alive signal;
a mobility state of the user equipment; or
a variation of a signal quality over a configured time interval.

21. The user equipment of claim 17, wherein the one or more processors are configured to execute the computer-executable instructions and further cause the user equipment to select a new serving network entity based on information indicating that the network entity is to enter an energy saving mode.

22. The user equipment of claim 21, wherein the one or more processors are configured to execute the computer-executable instructions and further cause the user equipment to receive the information indicating that the network entity is to enter an energy saving mode via a system information message.

23. The user equipment of claim 21, wherein the one or more processors are configured to execute the computer-executable instructions and further cause the user equipment to receive the information indicating that the network entity is to enter an energy saving mode via a radio resource control message.

24. The user equipment of claim 14, wherein the one or more processors are configured to execute the computer-executable instructions and further cause the user equipment to receive, from the network entity, an indication that the network entity is configured to:
send one or more SSBs in the send direction; and
monitor for uplink trigger messages during one or more configured uplink trigger occasions.

25. The user equipment of claim 14, wherein the indication of a threshold period of time after which the network entity will cease sending the one or more SSBs in the send direction is comprised within a system information block message.

26. The user equipment of claim 14, wherein the threshold period of time is based on a time of transmitting the first uplink trigger message.

27. The user equipment of claim 14, wherein the one or more processors are configured to execute the computer-executable instructions and further cause the user equipment to send, to the network entity, a second uplink trigger message prior to an expiration of the threshold period of time.

28. The user equipment of claim 27, wherein the second uplink trigger message is sent during a preconfigured periodic occasion.

29. A method of wireless communications by a user equipment, comprising:
monitoring for one or more downlink signals from a network entity while camping on the network entity;
receiving, from the network entity, an indication that the network entity is configured to:
send one or more SSBs in the send direction; and
monitor for uplink trigger messages during one or more configured uplink trigger occasions;
transmitting, to the network entity, a first uplink trigger message in a send direction during a configured uplink trigger occasion; and
receiving, from the network entity, one or more SSBs in the send direction after transmitting the first uplink trigger message.

* * * * *